(12) United States Patent
Holweg

(10) Patent No.: US 6,732,694 B2
(45) Date of Patent: May 11, 2004

(54) STARTING DEVICE FOR A TWIN CYLINDER INTERNAL COMBUSTION ENGINE IN A V-FORMAT

(75) Inventor: Claus Holweg, Obertrum (AT)

(73) Assignee: KTM Sportmotorcycle AG, Mattighofen (AT)

( * ) Notice: Subject to any disclaimer, the term of this patent is extended or adjusted under 35 U.S.C. 154(b) by 0 days.

(21) Appl. No.: 10/203,192

(22) PCT Filed: Feb. 14, 2001

(86) PCT No.: PCT/EP01/01636

§ 371 (c)(1),
(2), (4) Date: Oct. 15, 2002

(87) PCT Pub. No.: WO01/61183

PCT Pub. Date: Aug. 28, 2001

(65) Prior Publication Data

US 2003/0047156 A1 Mar. 13, 2003

(30) Foreign Application Priority Data

Feb. 15, 2000 (DE) .......................... 100 06 690

(51) Int. Cl.⁷ .......................... F02N 11/00; F02N 17/00; F02B 75/22; F02B 61/02
(52) U.S. Cl. .................. 123/179.25; 123/192.2
(58) Field of Search .................. 123/179.25, 179.26, 123/195 A, 192.2

(56) References Cited

U.S. PATENT DOCUMENTS

| | | | |
|---|---|---|---|
| 2,335,186 A | 11/1943 | Jackson | 123/195 |
| 2,925,742 A | 2/1960 | Strawn | 74/405 |
| 4,957,071 A | 9/1990 | Matsuo et al. | 123/52 |
| 5,657,728 A * | 8/1997 | Diggs | 123/192.2 |
| 6,450,890 B1 * | 9/2002 | Hendrian et al. | 464/180 |

FOREIGN PATENT DOCUMENTS

| | | | |
|---|---|---|---|
| EP | 0 158 453 A2 | 3/1985 | 75/18 |
| EP | 0 390 587 A1 | 3/1990 | |

* cited by examiner

Primary Examiner—Henry C. Yuen
Assistant Examiner—Arnold Castro
(74) Attorney, Agent, or Firm—Dinnin & Dunn, P.C.

(57) ABSTRACT

The invention relates to a starting device (2), for a twin cylinder internal combustion engine (1) with cylinders (4, 5) in a V-format, comprising an electrical starter motor (19) and a gear assembly (20), coupled thereto for transmission of the output torque from the starter motor (19) to a crankshaft (14) in the motor (1) and an overrunning clutch (21) arranged between the gear assembly (20) and the crankshaft (14), such that the starter motor (19) and the gear assembly (20) are arranged in the V-shaped space (3) between the cylinders (4, 5) and above the crankshaft (14).

10 Claims, 4 Drawing Sheets

STARTING DEVICE FOR A TWIN CYLINDER INTERNAL COMBUSTION ENGINE IN A V-FORMAT

The present invention relates to a starter for a Vee twin internal combustion engine including an electric starter motor and a gearing assembly coupled thereto as set forth in the preamble of claim 1.

The Vee twin internal combustion engine in the present context is a two-cylinder engine in a Vee arrangement intended for use in motorcycles. Saving weight in such an engine is of prime importance in the present context since a lightweight engine enhances handling the motorcycle powered thereby. When such a motorcycle is put to use, for instance, in cross-country sports events there is also the risk of damage when the engine is fitted with components exposed, for example, to impact by stones and grit thrown up by the front wheel of the motorcycle.

Hitherto, the motor of an electric starter on such a Vee twin engine was arranged either ahead of or behind the engine, as viewed in the forward direction, where it is exposed either to stone and grit impact or heat given off by the engine. Apart from this, this arrangement results in the design lacking compactness, since a starter motor arranged ahead of the engine increases the room needed in the frame of the motorcycle for locating the Vee twin engine and a starter motor arranged behind the rear cylinder, as viewed in the forward direction, requires a relatively long distance for communicating the torque from the starter motor to the crankshaft of the Vee twin engine.

Known from U.S. Pat. No. 2,335,186 A is an internal combustion engine in a Vee arrangement for an aircraft in which an electric starter motor is arranged in the Vee-shaped interspace between the cylinders and above the crankshaft. This starter motor is coupled via a gearing assembly to the crankshaft for communicating the drive torque.

The present invention is thus based on the objective of eliminating the aforementioned disadvantages by devising a starter for a Vee twin internal combustion engine wherein the starter motor is arranged outside of the region exposed to stone and grit impact and which enables a more compact arrangement of the Vee twin engine of the motorcycle frame.

The invention devised for achieving this objective comprises the features as set forth in claim 1. Advantageous aspects thereof read from the further claims.

In accordance with the invention a starter for a Vee twin internal combustion engine is now provided with an electric starter motor and a gearing assembly coupled thereto for communicating a torque output by the starter motor to a crankshaft of the engine and an overrunning clutch arranged between the gearing assembly and crankshaft, the starter motor and gearing assembly being arranged in the Vee-shaped interspace between the cylinders above the crankshaft. This arrangement results in the starter motor now being located outside of the region exposed to stone and grit impact whilst significantly reducing the room required for mounting the Vee twin engine in the frame of the motorcycle as compared to known arrangements.

According to the invention it is provided for that the gearing assembly has arranged above the crankshaft an intermediate shaft for communicating the torque output by the starter motor to the crankshaft and the intermediate shaft additionally being configured for balancing of masses and moments of first order. For this purpose a gearwheel may be rotatably mounted on the intermediate shaft, by which the torque output is communicated to the crankshaft.

This configuration of the intermediate shaft achieves a function concentration so that, as compared to known Vee twin engines, a reduction in weight is now achieved thanks to the starter in accordance with the invention for the Vee twin engine equipped therewith. This is due to the fact that the torque is now communicated from the starter motor to the crankshaft of the engine via a gearwheel mounted on the intermediate shaft and the intermediate shaft simultaneously serving as the balancer shaft of the engine which thus now requires no separate balancer shaft with the corresponding bearing locations as is the case with known Vee twin engines. Now, in accordance with the invention the function of balancing of masses and moments of first order is integrated in the intermediate shaft of the starter.

For this purpose it is provided for that on the intermediate shaft for balancing of masses and moments of first order a crank arm shaped or web-shaped balance mass is fixedly located both axially and rotatively at one axial end portion each of the intermediate shaft so that the web-shaped balance mass is located outside of or also between the webs of the crankshaft of the Vee twin engine.

A further means of saving space and thus enhancing the compactness of the Vee twin engine equipped with the starter in accordance with the invention is achievable by the intermediate shaft comprising at least one sprocket for driving a timing chain for actuating the valve gear of the internal combustion engine. This means in other words that the intermediate shaft may comprise two timing chain sprockets, each of which drives a timing chain for the camshaft drive of the front and rear cylinder head of the internal combustion engine equipped with the starter in accordance with the invention.

Equipping a liquid-cooled Vee twin engine with the starter in accordance with the invention now makes it possible to provide an impeller fixedly located axially and rotatively at one axial end of the intermediate shaft for pumping a coolant of the internal combustion engine. Integrating the coolant pumping function of such a liquid-cooled internal combustion engine in the intermediate shaft of the starter now makes it possible to eliminate two further bearing locations, namely the coolant pump shaft bearings, as compared to known engine concepts. This, together with the integration of the function for balancing free mass and moment forces in the intermediate shaft not only saves weight, it also reduces consumption, since as compared to known engine concepts several bearing locations as a source of friction can now be eliminated.

In another further embodiment of the starter in accordance with the invention it is provided for that for venting the crankcase of the internal combustion engine the intermediate shaft comprises a hole drilled substantially through the full axial length thereof, transversely to which at one axial end of the intermediate shaft a full-length hole is drilled crosswise for centrifugal engine oil scavenging.

Now, any overpressure building up in the crankcase due to blow-by in the combustion chambers of the Vee twin engine and due to the oscillating movement of the pistons in the cylinder liners in the crankcase can be relieved via the axial hole drilled lengthwise in the intermediate shaft, for example, into an air cleaner box communicating with a carburetion device of the Vee twin engine. Centrifugal engine oil scavenging through the intermediate shaft rotating, for example, at the speed of the crankshaft and the hole drilled crosswise thereto prevents the engine oil from gaining access to the air cleaner box.

It is also possible to implement engine oil scavenging by at least one drilled passage provided in a web-shaped balance mass on the intermediate shaft. This drilled passage thus runs from the longitudinal hole through the intermediate shaft and through the balance mass, resulting in a major length of the drilled passage developing a high speed at the end thereof due to rotation of the intermediate shaft for good engine oil scavenging and thus diminishing the load on the engine air cleaner with engine oil.

In this arrangement, the starter motor is now able to communicate its torque output directly to the gearwheel mounted on the intermediate shaft or indirectly via interposed gear shafts. By suitably selecting the transmission ratio between the starter motor and the crankshaft a comparatively low-power and thus small, compact electric starter motor is now sufficient for starting the Vee twin engine.

The overrunning clutch provided between the gearing assembly and crankshaft opens the non-positive connection between the starter motor and the crankshaft as soon as a predefined difference in speed is attained, i.e. once the Vee twin engine has been started, when its speed is higher than that of the crankshaft prompted by the starter motor before the engine is started.

The invention will now be detailed with reference to the drawing in which.

Figure 1:
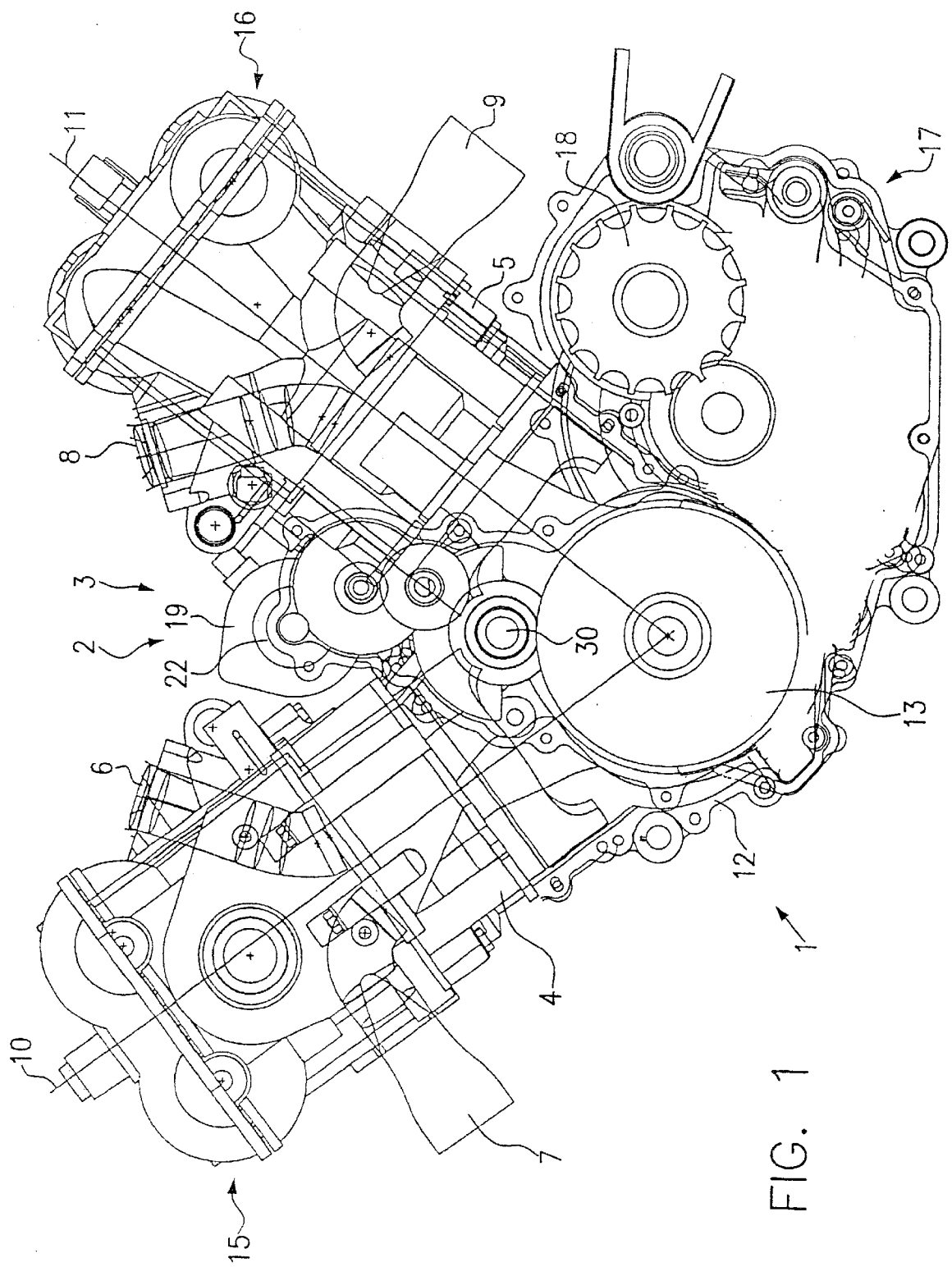
FIG. 1 is a diagrammatic side view of a Vee twin engine showing a starter arranged in the Vee interspace between the two cylinders.

Referring now to FIG. 1 of the drawing there is illustrated diagrammatically in a side view a Vee twin engine 1 including a starter 2 arranged in the Vee-shaped interspace 3 between the front cylinder 4 and rear cylinder 5.

As directly evident, the front cylinder 4 comprises an inlet 6 and an outlet 7 whilst the rear cylinder 5 comprises an inlet 8 and an outlet 9. In the embodiment as shown the Vee twin engine 1 comprises a cylinder angle of approx. 75° located between the upright centerline 10 of the front cylinder 4 and the upright centerline 11 of the rear cylinder 5.

Located in a crankcase 12 of the engine 1 behind or level with the cap 13 is a crankshaft 14 of the Vee twin engine 1. Including in the cylinder head 15 of the front cylinder 4 and in the cylinder head 16 of the rear cylinder 5 is the valve gear in the form of inlet and outlet valves as well as the valve drive.

Illustrated in the plane of the drawing to the right of the cap 13 and below the rear cylinder 5 is a multispeed gearbox 17 including a chain sprocket 18 mounted on an output shaft of the gearbox by which the torque output by the Vee twin engine 1 can be communicated via a drive chain (not shown) to the rear wheel of the motorcycle.

The starter 2 comprises an electric starter motor 19 and a gear assembly 20 coupled thereto (see FIG. 2) including a plurality of gear shafts and gearwheels for communicating the torque output by the starter motor 19 to the crankshaft 14 of the engine 1, an overrunning clutch 21 being arranged between the crankshaft 14 and the gear assembly 20.

Figure 2:
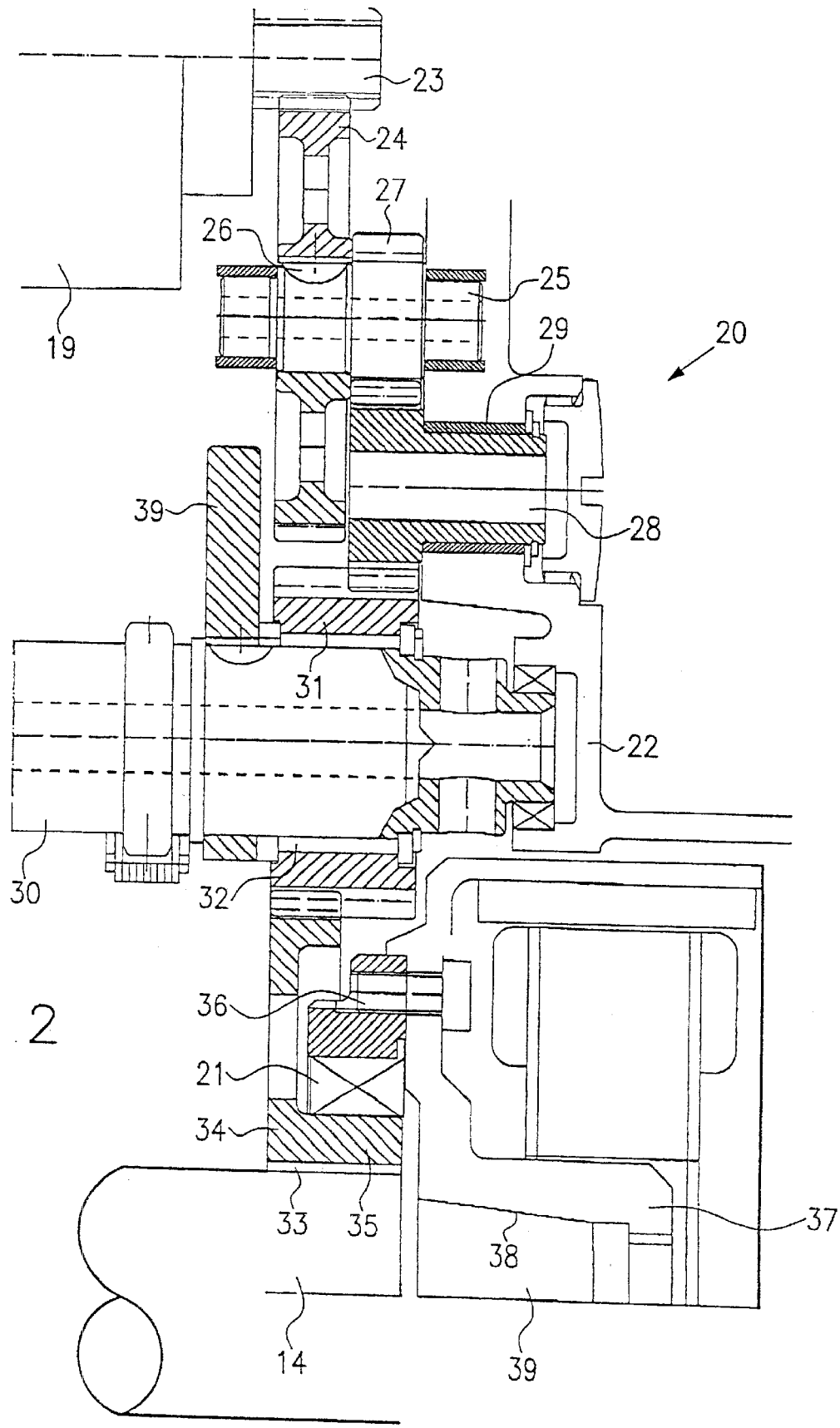
FIG. 2 is a partial sectional view through the starter as shown in FIG. 1.

Referring now to FIG. 2 of the drawing the components of the starter 2 will now be detailed.

The electric starter motor 19 is located on a casing boss 22 (see FIG. 1) of the engine 1. Protruding from a housing of the electric starter motor 19 is an output shaft 23 provided with spur teeth for mating with the spur teeth of a gearwheel 24 on a gear shaft 25. In this arrangement, the gearwheel 24 is non-rotatably located on the gear shaft 25 by a Woodruff key 26 so that the torque output by the electric starter motor 19 is introduced via the output shaft 23 and gearwheel 24 into the gear shaft 25 on which a second gearwheel 27 is non-rotatably mounted axially offset from the gearwheel 24. It is just as possible to locate the gearwheel 24 on the shaft 25 by means of a press fit instead of the Woodruff key 26. In this arrangement the shaft 25 may be rotatably mounted in the casing 22 by means of an antifriction bearing.

The gearwheel 27 mates with a gear shaft 28 provided with spur teeth, the gear shaft 28 being rotatably mounted via a bearing location 29 in the casing 22. In this embodiment the teeth of the gear shaft 28 are configured integral, although it is just as possible to locate, instead of the shaft 28, a journal in the casing 22 by means of a releasable bolting fastener. On the journal a rim gear may be axially located rotatably mounted by a needle bearing and engaging the gearwheel 27.

Via the gear shaft 28 or the aforementioned rim gear the torque output by the electric starter motor 19 is directed into a gearwheel 31 rotatably mounted by a needle bearing 32 on a intermediate shaft 30.

The gearwheel 31 mates with a gearwheel 34 rotatably mounted via a friction bearing 33 or needle bearing on the crankshaft 14 so that the torque output by the starter motor 19 ultimately rotates the gearwheel 34. Arranged at the outer circumference of the hub 35 of the gearwheel 34 is the overrunning clutch 21 so that with non-positive connection of the overrunning clutch 21 the torque output by the electric starter motor 19 is introduced via the gearwheel 34 and the outer cage of the overrunning clutch 21 and bolt fastener 36 into a ring gear 37 which is connected via a taper seat 38 and a parallel key (not shown) between the frusto-conical end 39 of the crankshaft 14 and the ring gear 37 positively to the crankshaft 14.

Thus, starting the Vee twin engine 1 on the motorcycle powered thereby requires, for example, the starter button at the end of the handlebar to be pressed by the rider to place the electric starter motor 19 in circuit, prompting it to output a torque via the output shaft 23 to the gearwheel 24. Via the further gearwheel 27, the spur gear shaft 28, gearwheel 31 and gearwheel 34 as well as the overrunning clutch 21 the torque output is communicated to the ring gear 37 and from there to the crankshaft 14. As soon as the engine 1 has attained a crankshaft speed in this way sufficient for starting and has commenced to run by itself, the speed of the crankshaft 14 significantly exceeds the starting speed so that the overrunning clutch 21 opens to disengage the gear assembly 20 from the crankshaft 14.

FIG. 2 shows further a section detail of the intermediate shaft 30 including a balance mass 39 arranged thereon. The intermediate shaft 30 is shown in more detail in FIG. 3 of the drawing by way of a partial section view.

The first balance mass 39 for balancing of free mass and moment forces of first order is non-rotatably located on the intermediate shaft 30 by a Woodruff key 40. The gearwheel 31 rotatably mounted via a bearing 32 on the intermediate shaft 30 is omitted in FIG. 3 to simplify the illustration. Arranged in the region of the end of the intermediate shaft 30 located axially opposite the assembly of the first balance mass 39 is a second balance mass 41, likewise non-rotatably located by means of a Woodruff key 42. The Woodruff key 42 also ensures that the torque is communicated between a spur gearwheel 43 and the intermediate shaft 30. In this arrangement the gearwheel 43 mates with a gearwheel located on the crankshaft 14 and the transmission ratio in this gearwheel pairing may be 1 to 1.

The gearwheel 43 is located by a shaft nut 44 and a washer 45 arranged between the gearwheel 43 and shaft nut 44 on the intermediate shaft 30.

Provided non-rotatably located on the intermediate shaft 30 are two timing chain sprockets 46, 47 by means of Woodruff keys, of which only one Woodruff key 48 is shown, so that via the sprockets 46, 47 timing chains (not shown) can be driven extending up to the region of the cylinder heads 15, 16 of the cylinders 4, 5 of the engine 1 where they control breathing via the valve gear in the form of camshafts, valves and the like. In an alternative embodiment the timing chain sprocket 47 may also be configured integrally with the shaft 30.

Arranged non-rotatably axially fixed to the right-hand half of the shaft 30, as shown in the drawing, is an impeller 49 on the intermediate shaft 30 for circulating the coolant of a liquid-cooled Vee twin engine 1 through a heat exchanger.

For venting the crankcase 12 of the Vee twin engine 1 the intermediate shaft 30 comprises a longitudinal hole 50 drilled substantially full-length axially through the intermediate shaft 30 and at which the end of the intermediate shaft 30 located axially opposite the impeller 49 fluidly communicates with a full-length transverse hole 51. Due to the centrifugal effect of the rotating intermediate shaft 30, oil housed in the crankcase 12 of the engine 1, which is transported through the longitudinal hole 50 due to the difference in pressure between that of the crankcase 12 and the environment or in the air cleaner box of the motorcycle by the gases to be expanded via the longitudinal hole, is scavenged via the transverse hole 51, leaving only the gases to be expanded into the air cleaner via the outlet port 52 and a nozzle as may be provided thereat.

Via the intermediate shaft 30 the torque output by the electric starter motor 19 is communicated on starting by means of the gearwheel 31 mounted thereon to the crankshaft 14. In addition, the intermediate shaft 30 ensures balancing of free first order mass and moment forces by the balance weights 39, 41 whilst serving via the timing chain sprockets 46, 47 as the drive for the valve gear in the cylinder heads of the engine 1 in integrating also elements substantial to venting the crankcase of the engine. As compared to known Vee twin engines this solution thus totally eliminates a shaft solely for balancing the first order or primary forces. Arranging the impeller 49 on the intermediate shaft 30 also eliminates the need for a separate impeller shaft in thus saving bearing locations, which in turn results in a reduction in the friction moment of the engine and thus also in a reduction in consumption. Integrating the starter 2 in the Vee-shaped interspace 3 of the Vee twin engine achieves a remarkably compact engine design, resulting in a reduction in size of the surface area joining the engine 1 to the frame of the motorcycle.

Figure 3:
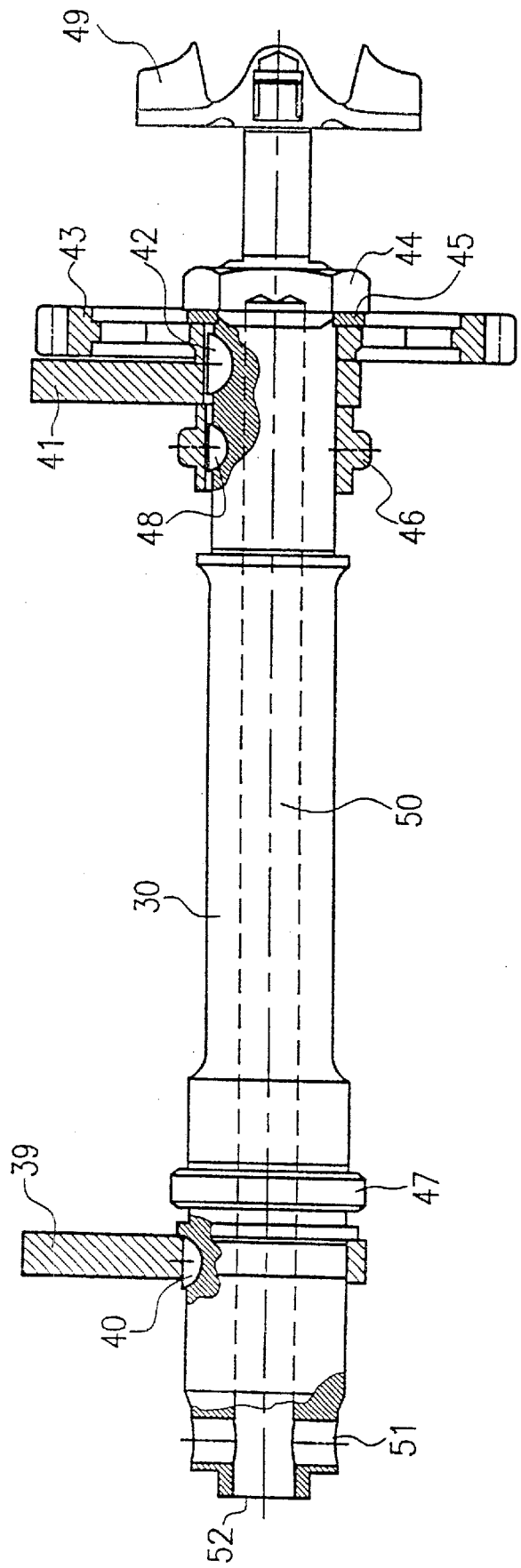
FIG. 3 is a partial section view of the intermediate shaft of the starter in accordance with a first embodiment.
Figure 4:
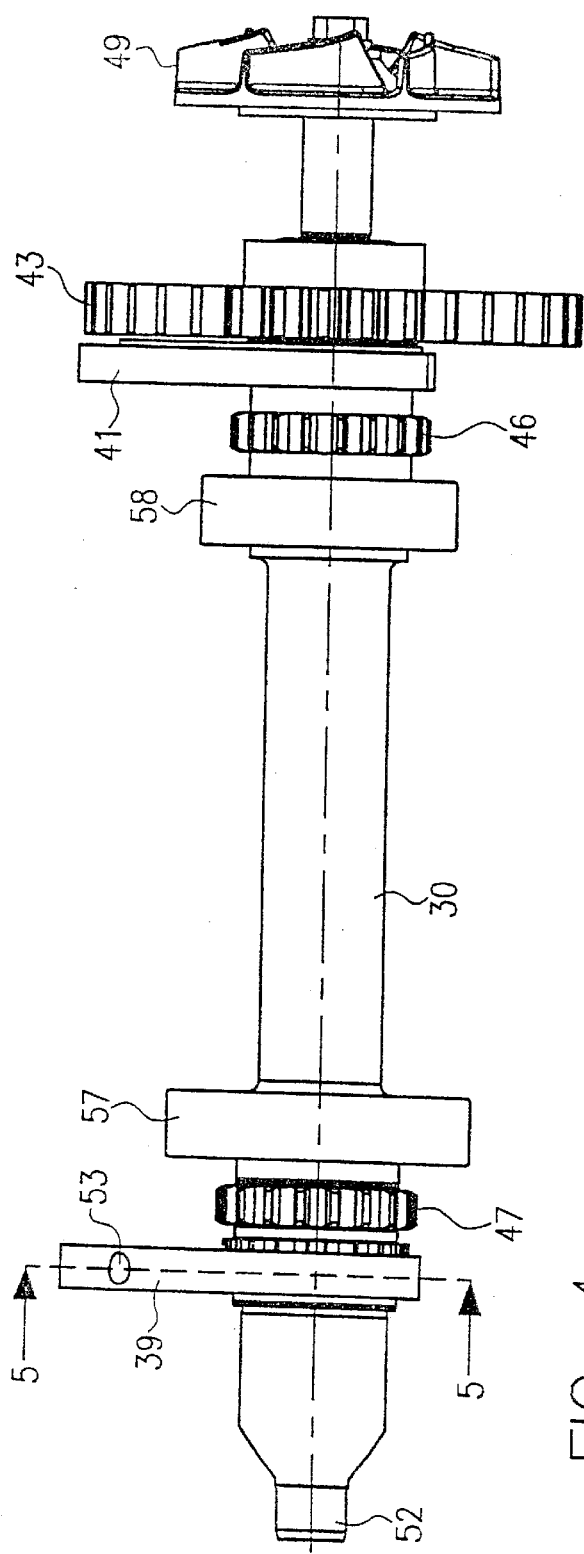
FIG. 4 is a view of an intermediate shaft in accordance with a further embodiment.

Referring now to FIG. 4 of the drawing there is illustrated a modified embodiment of an intermediate shaft 30. The intermediate shaft 30 as shown in FIG. 4 of the drawing corresponds substantially to the intermediate shaft 30 as shown in FIG. 3 of the drawing, except for differences in venting the crankcase and in oil scavenging.

Figure 5:
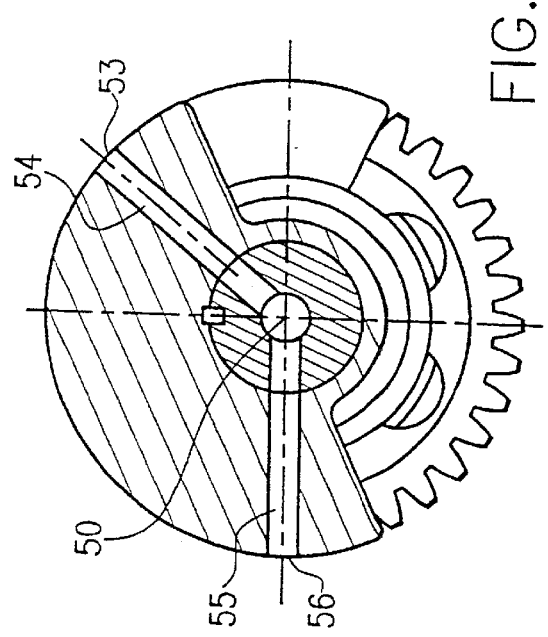
FIG. 5 is a section taken through FIG. 4 in the direction of the line 5—5.

As directly evident the intermediate shaft 30 as shown in FIG. 4 of the drawing comprises in the region of the balance mass 39 shown on the left in the plane of the drawing a hole 53 for more location details of which reference is made to FIG. 5 of the drawing.

The hole 53 is the outlet port of a drilled passage 54 configured in the balance mass 39 connecting the hole 53 to the center longitudinal hole of the intermediate shaft 30. In addition, to this drilled passage 54 the balance mass 39 comprises a further drilled passage 55 having a corresponding outlet port 56 located to the rear of the plane as shown in FIG. 4 of the drawing.

The drilled passages 54, 55 serve to scavenge engine oil from the crankcase breather, the reason for the larger radius on which the holes 53, 56 lie as compared to the radius of the outlet ports of the transverse hole 51 of the intermediate shaft 30 as shown in FIG. 3 of the drawing being an even more effective solution for engine oil scavenging for the same speed of the corresponding intermediate shaft 30. Instead of being located on a shaft end provided with a male thread as shown in FIG. 3 of the drawing the impeller 49 may also be bolted to the shaft end with a shaft-hub connection between the impeller 49 and shaft end in the form of a square profile, for instance. Evident from FIG. 4 of the drawing are two further antifriction bearings 57, 58 in the form of ball bearings by means of which the intermediate shaft can be mounted in the crankcase of the Vee twin engine.

The starter 2 and more particularly the electric starter motor 19 are protected from stone and grit impact as thrown up by the front wheel of the motorcycle which is particularly of importance in the case of cross-country sports motorcycles.

It is to be noted that express reference is made to the claims and to the drawing as regards any features of the invention not detailed above.

What is claimed is:

1. A starter (2) for an internal combustion engine (1) comprising twin cylinders (4, 5) in a Vee arrangement, including an electric starter motor (19) and a gearing assembly (20) coupled thereto for communicating a torque output by said starter motor (19) to a crankshaft (14) of said engine (1) and an overrunning clutch (21) arranged between said gearing assembly (20) and said crankshaft (14), said starter motor (19) and said gearing assembly (20) being arranged in the Vee-shaped interspace (3) between said cylinders (4, 5) above said crankshaft (14), characterized in that said gearing assembly (20) has arranged above said crankshaft (14) an intermediate shaft (30) for communicating the torque output by said starter motor (19) to said crankshaft (14) by means of a gearwheel (31) rotatably mounted on said intermediate shaft (30) and said intermediate shaft (30) is also configured for dynamic balancing of first order masses and moments.

2. The starter as set forth in claim 1, characterized in that on said intermediate shaft (30) for dynamic balancing a web-shaped balance mass (39, 41) is fixedly located both axially and rotatively at one axial end portion each of said intermediate shaft (30).

3. The starter as set forth in claim 1, characterized in that said intermediate shaft (30) comprises at least one sprocket (46, 47) for driving a timing chain for actuating the valve gear of said internal combustion engine (1).

4. The starter as set forth in claim 1, characterized in that an impeller (49) is fixedly located axially and rotatively at one axial end of said intermediate shaft (30) for pumping a coolant of said internal combustion engine (1).

5. The starter as set forth in claim 1, characterized in that for venting the crankcase (14) of said internal combustion engine (1) said intermediate shaft (30) comprises a longitudinal hole (50) drilled substantially through the full axial length thereof, transversely to which at one axial end of said intermediate shaft (30) a full-length hole (51) is drilled crosswise for centrifugal oil scavenging of said internal combustion engine (1).

6. The starter as set forth in claim 1, characterized in that for venting the crankcase (14) of said internal combustion engine (1) said intermediate shaft (30) comprises a longitudinal hole (50) drilled substantially through the full axial length thereof, transversely to which at least one hole (54, 55) is drilled crosswise in a web-shaped balance mass (39) for centrifugal oil scavenging of said internal combustion engine (1).

7. The starter as set forth in claim 1, characterized in that via a gear shaft (25) provided with two gearwheels (24, 27) arranged axially spaced away from each other and a further gear shaft (28) provided with a gearing, said starter motor (19) is coupled to a gearwheel (31) rotatably mounted on said intermediate shaft (30) for communicating the torque.

8. The starter as set forth in claim 7, characterized in that the longitudinal centerlines of said two gear shafts (25, 28) are offset from the longitudinal centerline of said output shaft (23) of said starter motor (19) and the longitudinal centerline of said intermediate shaft (30) in the direction of said rear cylinder (5).

9. The starter as set forth in claim 1, characterized in that said overrunning clutch (21) opens the non-positive connection between said starter motor (19) and said crankshaft (14) as soon as a predefined speed difference is attained between the crankshaft and the intermediate shaft (30).

10. A twin-cylinder internal combustion engine including a starter as set forth in claim 1.

\* \* \* \* \*